United States Patent
Tinlin

(10) Patent No.: US 9,625,285 B2
(45) Date of Patent: Apr. 18, 2017

(54) MULTI-PIECE INLINE JET-SONDE

(71) Applicant: Jeffrey S. Tinlin, Mokena, IL (US)

(72) Inventor: Jeffrey S. Tinlin, Mokena, IL (US)

(*) Notice: Subject to any disclaimer, the term of this patent is extended or adjusted under 35 U.S.C. 154(b) by 8 days.

(21) Appl. No.: 14/817,174

(22) Filed: Aug. 3, 2015

(65) Prior Publication Data
US 2015/0331136 A1    Nov. 19, 2015

Related U.S. Application Data

(63) Continuation of application No. 13/031,979, filed on Feb. 22, 2011, now Pat. No. 9,095,883.

(60) Provisional application No. 61/306,800, filed on Feb. 22, 2010.

(51) Int. Cl.
| | | |
|---|---|---|
| G01D 11/24 | (2006.01) | |
| G01V 3/15 | (2006.01) | |
| G01V 3/08 | (2006.01) | |
| E21B 17/20 | (2006.01) | |
| E21B 17/00 | (2006.01) | |
| B08B 9/049 | (2006.01) | |

(52) U.S. Cl.
CPC .......... *G01D 11/245* (2013.01); *B08B 9/0495* (2013.01); *E21B 17/00* (2013.01); *E21B 17/20* (2013.01); *G01V 3/08* (2013.01); *G01V 3/15* (2013.01)

(58) Field of Classification Search
CPC ....... G01D 11/245; E21B 17/00; E21B 17/20; E21B 2023/008; G01V 3/15
See application file for complete search history.

(56) References Cited

U.S. PATENT DOCUMENTS

| | | | | |
|---|---|---|---|---|
| 4,473,921 A | * | 10/1984 | Weber | B08B 9/035 15/104.09 |
| 5,857,531 A | * | 1/1999 | Estep | E21B 4/02 175/101 |
| 6,367,366 B1 | * | 4/2002 | Bloom | E21B 4/18 92/5 R |
| 6,644,421 B1 | * | 11/2003 | Long | E21B 47/011 175/320 |
| 6,792,820 B2 | * | 9/2004 | Wentworth | E03F 3/06 15/104.03 |

(Continued)

*Primary Examiner* — Hezron E Williams
*Assistant Examiner* — David Z Huang
(74) *Attorney, Agent, or Firm* — Goodhue, Coleman & Owens, P.C.

(57) ABSTRACT

A multi-piece sonde configuration for use in troubleshooting a pipe and providing precise location of the problem includes a sonde carrier having a first end adapted to attach to a line and a second opposite end adapted to attach to a troubleshooting device. The multi-piece sonde can include a first carrier having a sonde housing with a central fluid passageway and a sonde transmitter operably positioned about the central fluid passageway. A second carrier can include a housing with a central fluid passageway and a power source carried by the second carrier. A flexible connector has a central fluid passageway and first and second opposing ends, and the first carrier is operably connected to the first end of the flexible connector and the second carrier is operably connected to the second end of the flexible connector. An electrical connection between the power source and the sonde transmitter can be carried by the flexible connector.

19 Claims, 10 Drawing Sheets

(56) References Cited

U.S. PATENT DOCUMENTS 7,172,035 B2\* 2/2007 Michael ................ E21B 47/011
 175/19
7,600,582 B2\* 10/2009 Wright, Jr. .............. E21B 47/01
 166/242.5

\* cited by examiner

MULTI-PIECE INLINE JET-SONDE

CROSS-REFERENCE TO RELATED APPLICATIONS

This application is a continuation of U.S. patent application Ser. No. 13/031,979 filed Feb. 22, 2011, which claims priority under 35 U.S.C. §119 to U.S. Provisional Application Ser. No. 61/306,800 filed Feb. 22, 2010, both of which are hereby incorporated by reference in their entirety.

FIELD OF THE INVENTION

The present invention relates to an apparatus, method and system for tracking the location of an in-pipe troubleshooting, evaluation or cleaning device. More specifically, the present invention relates to an apparatus, method and system for providing precision location of a cleaning nozzle, evaluation or other troubleshooting device within above and underground pipes.

BACKGROUND OF THE INVENTION

Pre-existing methods for determining the location of a cleaning nozzle within a pipe exist but are not without problems and concerns that result in the need for allocating additional resources and monies to resolve the problems associated with each method. One device for determining the location of a cleaning nozzle includes a hose reel footage counter. This method includes counting the footage of hose being dispensed from the reel as the nozzle works its way through the pipe. Several problems are associated with this method. In particular, this method suffers from footage reporting inaccuracies. For example, mechanical counters use a tension wheel pressed against the side of the hose reel which counts the rotations as the hose is being dispensed. This particular method is highly inaccurate as it does not consider the varying length of hose that is being dispensed as the circumference of the hose on the reel changes from the outermost hose wrap to the innermost hose wrap. This method is intended as an approximate guide only and does not provide a precision or pinpoint locating system for identifying the location of a cleaning nozzle within a pipe. Mechanical counters of this type are also subject to wear and degradation over time which results in further discrepancies and inaccuracies in the calculation of pipe footage being dispensed from the reel. Reliance upon a mechanical counter in determining the problem location can result also when the underground pipe does not follow a straight line or if the pipe deviates, jogs or veers from underground pipe records or maps. This problem is often magnified when the pipe is underground and hidden from view, which makes it difficult to discern where the problem area truly exists even if the mechanical counter provides the correct footage to the problem.

Alternatively, digital footage counters use a built-in encoder to count the footage of high-pressure jet-hose as it is fed into a pipe by using an algorithm that accounts for hose length, diameter, and dimensions of the hose reel to more accurately provide a footage guide. However, like the mechanical version, the digital counter may not be correct as it must always rely on a constant set of input information to remain even remotely accurate. Changes to hose length or other variables that must be input by the machine operator can drastically reduce accuracy. In addition, many older pipe-cleaning machines using high pressure jet-hose for pipeline cleaning operations are not fitted with this digital counter technology, and cannot be without a great deal of expense.

It is critical troubleshooting/evaluation that the counter be able to accurately identify and pinpoint the position of a troubleshooting/evaluation device or cleaning nozzle based on the length of hose having been dispensed. Because hose reel footage counters are inaccurate, reliance on readings from such machines can result in the inability to accurately identify the exact area or location where the device is located. Failure to accurately pinpoint the exact problem area could result in a mis-dig, which is very costly and can result in damage to other utilities within the dig area. Misidentifying the exact location of a blockage within a pipe can also result in other expensive costs, such as for example, where the location identified in error is under a building structure where digging is very time consuming and costly due to moving of machinery or other fixtures present in the building. Any misdiagnosis of the problem area within the pipe and the resulting expenditures and resources exhausted by determining that a misdiagnosis occurred are expenses that many businesses are not willing to bear. Therefore, a need has been identified in the art to provide an apparatus, method and system for precisely identifying these locations within a pipe.

Other techniques have also been identified for locating the position of a troubleshooting/evaluation device or cleaning nozzle within a pipe. For example, commercially available battery operated transmitters (e.g., sonde) have been attached to the cleaning nozzle or high-pressure jet-hose using temporary means such as Duct tape, hose clamps or other attaching means. Because of the insecure method by which such transmitters are attached to the nozzle or hose, it is never certain once the transmitter enters the pipe and extends out of view of the operator whether or not the transmitter remains with the nozzle or hose or whether it becomes partially or completely separated from the nozzle during the cleaning operation. In the case where the transmitter is secured by temporary means, it may become separated due to the force of water being introduced into the pipe by the nozzle or by other debris within the pipe which comes into contact with the transmitter and separates it from the nozzle or hose. Anytime the transmitter becomes separated from the nozzle or hose, a misdiagnosis of the problem area can result. For smaller pipe applications (3-6 inch pipe), securing a transmitter to the nozzle may not allow the unit to fit within the pipe, and even so results in a higher risk of separation of the transmitter from the nozzle or hose during the cleaning operation. The pressure of the water provided to the nozzle further increases the risk that the transmitter may become separated from the nozzle or hose during the cleaning operation. Cleaning nozzles generally operate with water pressures ranging from 1,000 psi up to 4,000 psi. High-pressure water of this magnitude can easily separate the transmitter from the nozzle thereby resulting in a misdiagnosis of the problem in the pipe. The loss of a transmitter can also result in a loss of several hundreds or thousands of dollars to a business depending upon the number of times a misdiagnosis occurs and the number of times in which the transmitter becomes separated from the nozzle and has to be replaced. Therefore, a need has been identified in the art to provide a cleaning system using a nozzle or other troubleshooting/evaluation device having an inline transmitter (i.e., sonde) that does not enter the pipe at the risk of becoming separated from the nozzle or hose during the cleaning operation.

Other techniques for identifying position of a cleaning nozzle, evaluation or troubleshooting device within a pipe are also available. For example, high pressure jet-hose with wires imbedded within the wall of the hose allow an operator to track the distance of the hose from the reel to the nozzle to identify the problem area within a pipe. Using this type of hose, a special frequency transmitter, requiring external power, can be purchased and hooked up to the hose to transmit a signal through the entire length of the hose using the imbedded wire. The entire length of the hose can then be traced using an above ground locator to determine the location of the hose or nozzle and possibly the problem area within the pipe. Use of this technique requires the operator to replace the hose they would normally use with a more expensive hose having the imbedded wires. With the hose being the most frequently replaced component of a pipe cleaning device, due to the wear and tear on this item, this can result in a very costly expenditure to a business Therefore, a need has been identified in the art to provide an apparatus, method and system for pinpointing the exact location of a cleaning nozzle or other troubleshooting/evaluation device within a pipe which uses the existing high-pressure jet-hose of the pipe cleaning unit, is resistant to electrical noise and allows proper diagnosis of problems in pipe depths not previously attainable.

BRIEF SUMMARY OF THE INVENTION

It is a primary object, feature or advantage of the present invention to improve over the state of the art.

It is a further object, feature or advantage of the present invention to provide an apparatus, system and method for pinpointing the location of a cleaning nozzle or other troubleshooting/evaluation device within a pipe whether above or under ground when using a pipe-cleaning jet-hose.

Yet another object, feature or advantage of the present invention is to provide an apparatus, system and method for ensuring that the transmitter (e.g., sonde) remains intact with the high-pressure jet-hose, cleaning nozzle or other troubleshooting/evaluation device during the cleaning or troubleshooting/evaluation operation using a pipe-cleaning jet-hose.

A further object, feature or advantage of the present invention is to provide an apparatus, system and method for an inline jet-sonde that can be used with existing pipe cleaning or evaluation systems.

Yet another object, feature or advantage of the present invention is to provide an apparatus, system and method for an inline jet-sonde that is self-powering (battery operated) to allow for stand alone operation without the need for external power.

Still another object, feature or advantage of the present invention is to provide an apparatus, system and method for an inline jet-sonde having its own power generation means for providing power to some or all electronic components of the system.

One or more of these and/or other objects, features or advantages of the present invention will become apparent from the specification and claims that follow.

According to one aspect of the present invention, a sonde for use in determining the in-pipe location during troubleshooting, evaluating, or cleaning a pipe is provided. The sonde includes a sonde housing having a generally hollow core. A sonde transmitter is operable positioned within the sonde housing. The sonde housing is mounted at least partially surrounding a hose in connection with a troubleshooting, evaluation, or cleaning device.

According to another aspect of the present invention, an inline sonde and carrier configuration for use in pinpoint locating during cleaning, troubleshooting and evaluation of a pipe is disclosed. The inline sonde and carrier configuration includes a sonde carrier having a first end adapted to attach to a high-pressure jet-hose and second opposite end adapted to attach to a troubleshooting/evaluation device, and a sonde transmitter having a hollow core. The sonde transmitter is mounted inline with a sonde carrier between the first and second end. In a preferred form, the inline sonde includes a sleeve separating the first and second ends. The sonde is received inline onto the sonde carrier sleeve by passing the sleeve through the hollow core. The first end of the sonde carrier is associated with a first body portion and the second end of the sonde carrier is associated with a second body portion. The sonde carrier includes means for removably coupling the first and second body portions together.

According to another aspect of the present invention, an inline sonde and carrier system for us in pinpoint location during troubleshooting, evaluating or cleaning a pipe is disclosed. The system includes a sonde carrier having a water passageway and a first end adapted for connection to a high pressure, pipe-cleaning jet-hose and a second opposite end adapted for connection to a nozzle, and a sonde transmitter having a body adapted for passing the water passageway of the sonde carrier therethrough so as to allow the sonde transmitter to reside inline with the sonde carrier. In a preferred form, the inline sonde and carrier system attaches to a high pressure water line connectable to the first end of the sonde carrier for providing water to the nozzle, a signal locator for detecting the precise location of the sonde carrier and transmitter within the pipe, and means for converting water flow through the water passageway into electricity for powering the sonde transmitter.

A new method for an inline sonde and carrier combination is also disclosed. The method includes the steps of providing a sonde carrier having a water passageway for communicating water between a high pressure water line and a nozzle, connecting a sonde transmitter inline with the sonde carrier between the water line and the nozzle, and communicating water through the sonde carrier and transmitter for operating the nozzle. In a preferred form, the method also includes the steps of electrically powering the sonde transmitter using an electrical storage device within the sonde transmitter and/or generating electricity from water flow through the water passageway for powering the sonde transmitter.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE PREFERRED EMBODIMENTS

Figure 1:
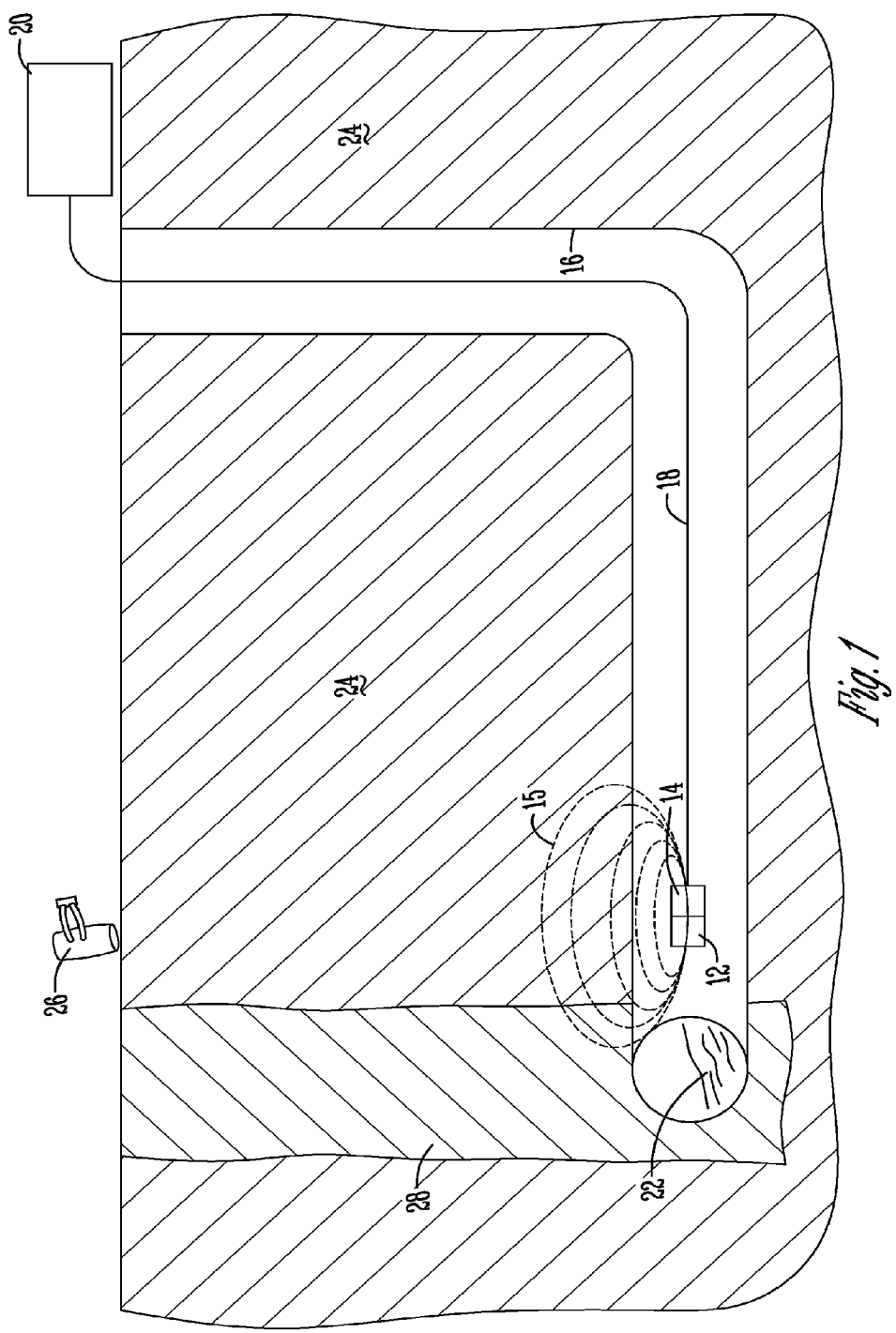
FIG. 1 illustrates a system according to one aspect of the present invention.

The present invention includes a number of aspects, all of which have broad and far-reaching application. FIG. 1 illustrates an overview of a system for the present invention. In general, a system for pipe cleaning includes a high pressure water source 20 connected to a nozzle 12 via hose 18. Nozzle 12 includes one or more jets 76 angled rearward to assist in moving the nozzle 12 through pipe 16 and any blockage or restriction 22 within pipe 16. The nozzle 12 can be water powered, such as where high pressure liquid is used to cut through and clean away debris or scaling on or in the pipe. The nozzle 12 can also be mechanical and include mechanical elements, such as a chain or auger to knock away and cut through roots, solid or other blockages. The inline jet-sonde 10 includes a sonde (also called a transmitter, beacon, or duct probe) that emits a signal 15 of desired frequency detectable by locator 26. The signal 15 emitted from the sonde 14 travels through the medium separating the sonde 14 from the locator 26 such as earth 24 to identify the precise location of the inkjet-sonde 10 within pipe 16. In the case of a damaged pipe or restriction that requires service, the inline jet-sonde 10 allows precise identification of the required dig zone 28 for accessing the problem area within the pipe. It should also be appreciated that the inline jet-sonde 10 can be used in above ground pipes as well. For instance, in certain pipe repair, an above ground pipe may need to be inspected or cleaned. The sonde 10 can be used to locate blockages or other areas of concern in the above-ground pipes.

Figure 2:
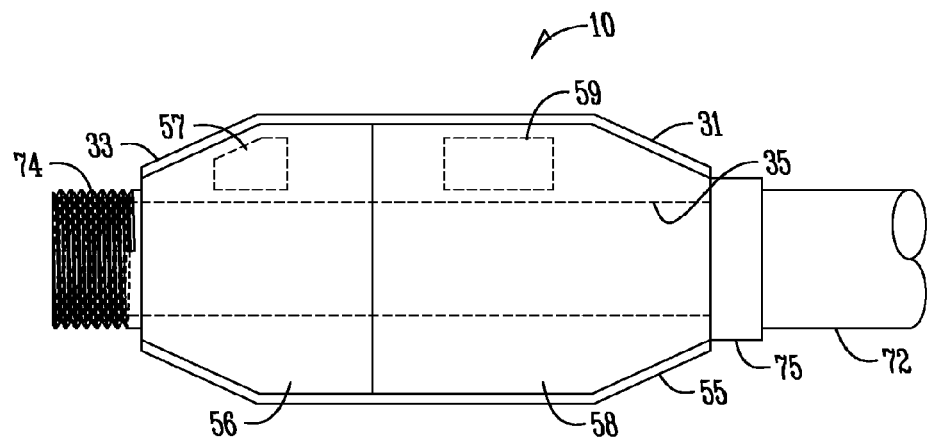
FIG. 2 is a side elevation view of a sonde according to one aspect of the present invention.

FIG. 2 is a side elevation view of an inline jet-sonde 10 according to one aspect of the present invention. A sonde 10 houses both an energy storage device 57 and sonde hardware 59. The sonde 10 comprises a sonde housing 56 and a battery housing 58. The two housings are separate so that there can be access to the sonde hardware 57 and the energy storage device or battery 59. Additionally, a sleeve 55 can be placed around the two housings 56 and 58 to ensure the housings stay together to create a single housing, and also to act as a barrier to keep water or other debris from penetrating inside the sonde device 10. The sleeve 55 shown in FIG. 2 is a rubber sleeve friction fit around the two housings. It should also be appreciated that the two housings 56 and 58 can be connected to one another with a plurality of set screws, snaps, adhesives, hook and loops, or the like. The energy storage device 57 may be a battery, which can be rechargeable, as will be described in greater detail below. The energy storage device 57 may also be powered by water passing through a pipe cleaning jet hose 72, as will also be discussed below.

The sonde 10 has first and second ends 31, 33 that are beveled or tapered from the hose 72 to a central region of the carrier. The two housings of the sonde 10 of FIG. 2 may be comprised of a plastic material, molded resin or epoxy, aluminum, or high grade stainless steel. It is further contemplated that other materials capable of no or little corrosion, while also being water tight, can be used. Furthermore, the sonde 10 is hollow, or donut shaped in that it can at least partially surround the hose 72. The hollowed portion 35 allows the inline jet-sonde 10 to be easily mounted on or over the hose 72. It should be noted that in a preferred embodiment, the sonde 10 fully surrounds the hose. However, the present invention appreciates that it may be beneficial, and thus required, for the sonde 10 to not fully surround the hose 72. Additionally, the first end 31 of the sonde 10 is positioned adjacent the threaded portion or connector 74 of the hose 72 such that the sonde 10 will not be able to move or slide beyond that point. A stop member 75 may be added adjacent the second end 33 of the sonde 10 to prevent movement in the opposite direction along the hose 72 as well. The stop member 75 may be a clamp, washer, rubber band, or the like which is frictionally fit about the hose 72 to prevent the sonde 10 from moving along the length of the hose 72. The sonde hardware 59 acts as a transmitter to emit signals 15 that are detectable by a locator 26, as shown in FIG. 1.

Figure 3:
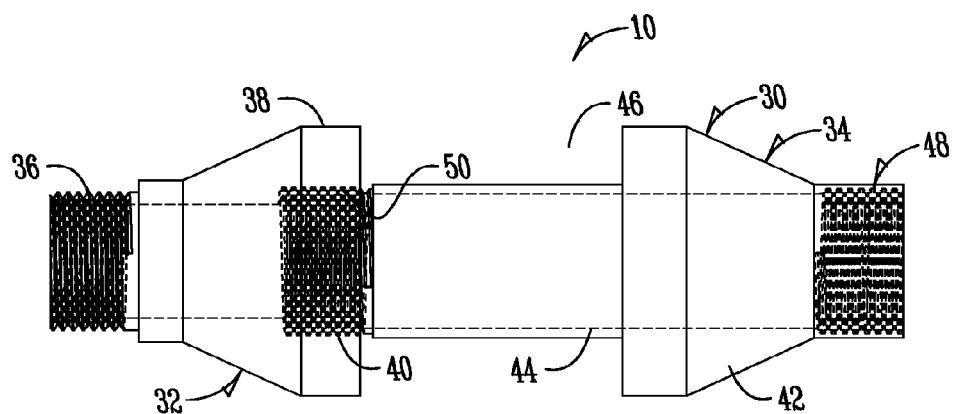
FIG. 3 is a side elevation view of a sonde carrier according to one aspect of the invention.
Figure 5A:
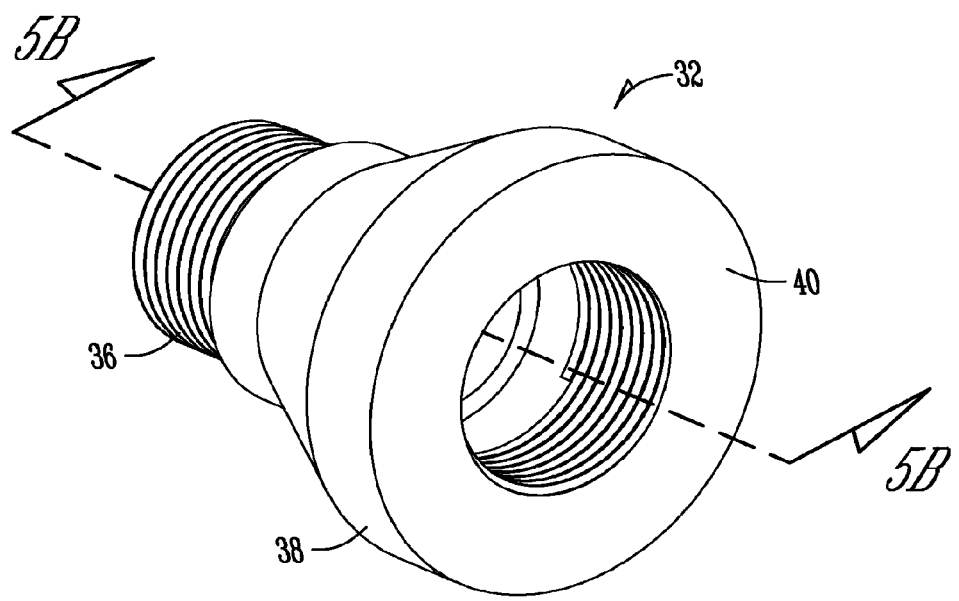
FIG. 5A is a perspective view of another member of the sonde carrier shown in FIG. 3.
Figure 5B:
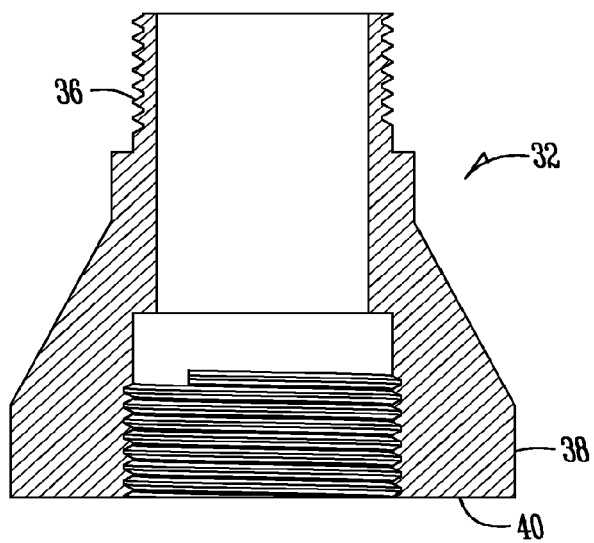
FIG. 5B is a sectional view taken along line 5B-5B in FIG. 5A.
Figure 13:
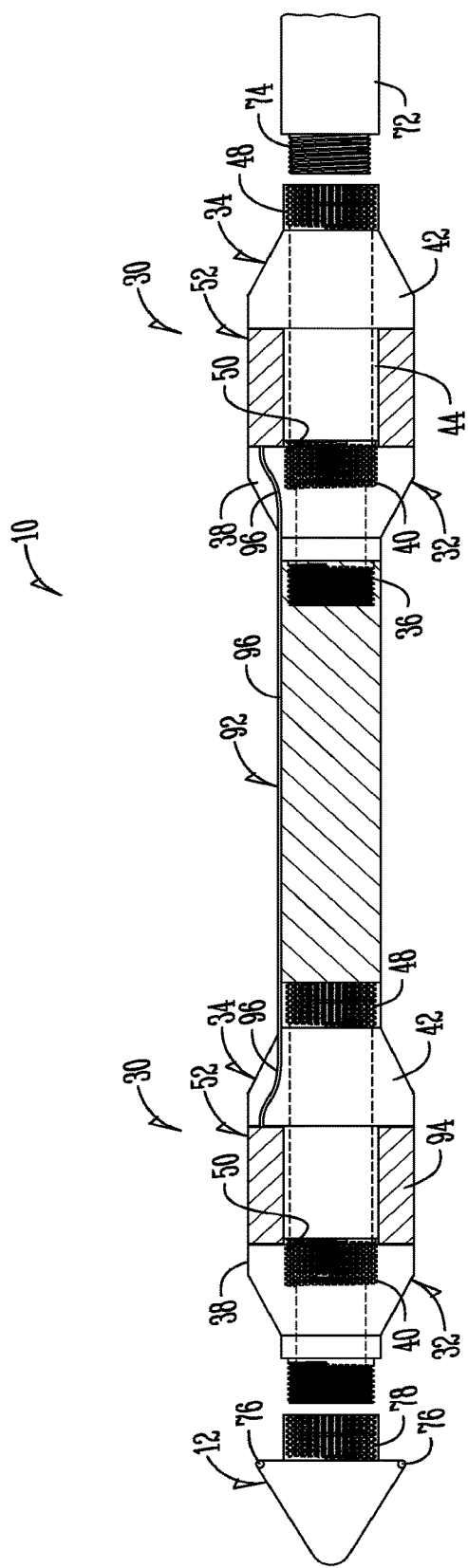
FIG. 13 is a sectional side elevation view illustrating sonde and generator carrier configuration according to another aspect of the invention.

FIG. 3 is a side elevation view of a sonde carrier according to one aspect of the invention. The sonde carrier 30 is a device that interconnects a cleaning nozzle 12 (such as illustrated in FIG. 7) or other troubleshooting device inline with a high pressure line (such as high pressure line 72 illustrated in FIG. 7). The sonde carrier provides a platform or carrier for keeping the sonde (illustrated in FIG. 6) inline between the nozzle and the high pressure line hose. In one embodiment, the carrier 30 is comprised of a high grade stainless steel. However, it is also contemplated that other materials, such as aluminum, may be used to form the carrier. The sonde carrier 30 includes one or more parts coupled together to provide a carrying position for the sonde inline with the nozzle and high pressure line. The carrier can be configured as a one, two or multi-piece body, or even a flexible two-piece design as illustrated in FIG. 13. According to one aspect of the invention, the sonde carrier 30 includes a nozzle coupler 32 (detailed in FIGS. 5A-5B). The nozzle coupler 32 has a first end 36 having means for connecting to the nozzle 12 (illustrated in FIG. 7) or other evaluation or troubleshooting device, such as a cleaning nozzle or a troubleshooting/evaluation device that uses video imagery, laser or sonar. Various industry connector types may be used to connect the first end 36 of nozzle couple 32 to nozzle 12. For example, a lure lock, screw type, locking type, slip type, quick disconnect or bayonet type connector are just a few of the type of connectors that could be used. In one form, the nozzle coupler 32 includes a flange portion 38 for transitioning the diameter of the first end 36 to a diameter commensurate with the diameter of the sonde (illustrated in FIG. 7). Opposite the first end 36 of the nozzle coupler 32 is a second end 40. Similar to the first end 36, the second end 40 includes means for connecting to the hose coupler 34 illustrated in FIGS. 5A-5B. Connective means similar to those proposed for the first end 36 of nozzle coupler 32 are contemplated for the second end 40 for connecting to the hose coupler 34. The present invention further contemplates that the connective means on the first end 36 and second end 40 of the nozzle coupler 32 may be a male connector or female connector according to the various needs of each design. Various seal types, O-rings, grommets and other sealing members may be used in combination with the first end 36 and/or second end 40 of nozzle coupler 32 to provide a tight fitting interface between the first end 36 and the nozzle 12 and the second end 40 and the hose coupler 34.

Figure 4A:
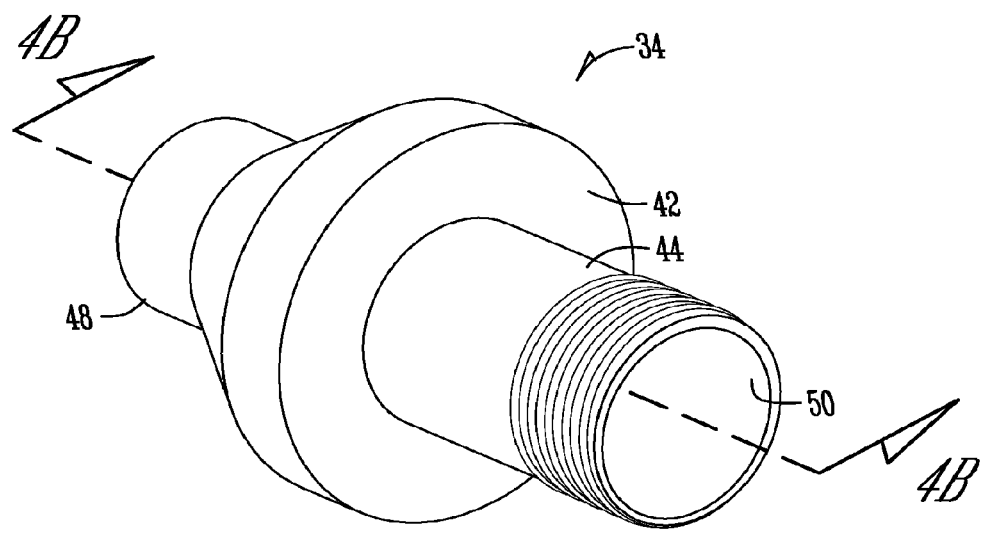
FIG. 4A is a perspective view of one member of the sonde carrier shown in FIG. 3.
Figure 4B:
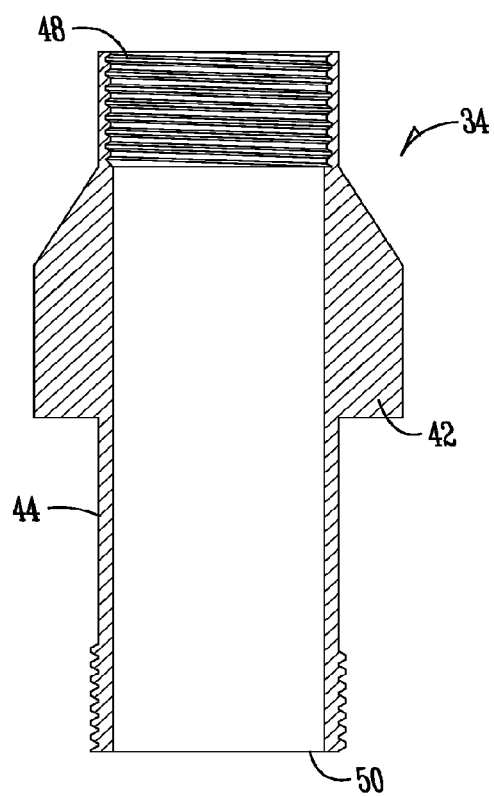
FIG. 4B is a sectional view taken along line 4B-4B in FIG. 4A.

FIGS. 4A-4B illustrate a hose coupler 34 according to one aspect of the invention. Hose coupler 34 includes a first end 48 and opposite second end 50. In one form of the coupler, a flange portion 42 is spaced between the first and second ends. The first end 48 of the coupler 34 includes means for connecting to a high pressure water line (such as high pressure line 72 illustrated in FIG. 7). Means for connecting first end 48 to the high pressure line include the aforementioned connective means. Similar connective means are contemplated at the second end 50 of the hose coupler 34 for connecting the hose coupler 34 to the nozzle coupler 32. Like the nozzle coupler 32, the flange portion 42 of hose coupler 34 expands radially outward to a diameter commensurate with the diameter of the sonde 52 illustrated in FIG. 7. Spaced between the flange portion 42 and the second end 50 of the hose coupler is a sleeve portion 44. The sleeve portion 44 defines a separation distance between the flange portion 38 of the nozzle coupler 32 and the opposing flange portion 42 of the hose coupler 34. FIG. 3 illustrates the nozzle coupler 32 connected with the hose coupler 34. A saddle area 46 is formed between the flange portions 38 and 42 for housing the sonde 52 illustrated in FIG. 6 inline and between the hose coupler 34 and the nozzle coupler 32. The invention contemplates various flange angles and diameters to accommodate varying sized sondes. Further, the length of the sleeve portion 44 of hose coupler 34 may be adjusted to accommodate various size sondes.

Figure 6:
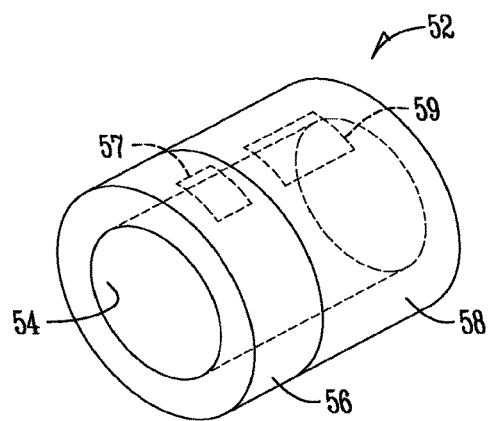
FIG. 6 is a side elevation view of a sonde housing according to one aspect of the present invention.
Figure 7:
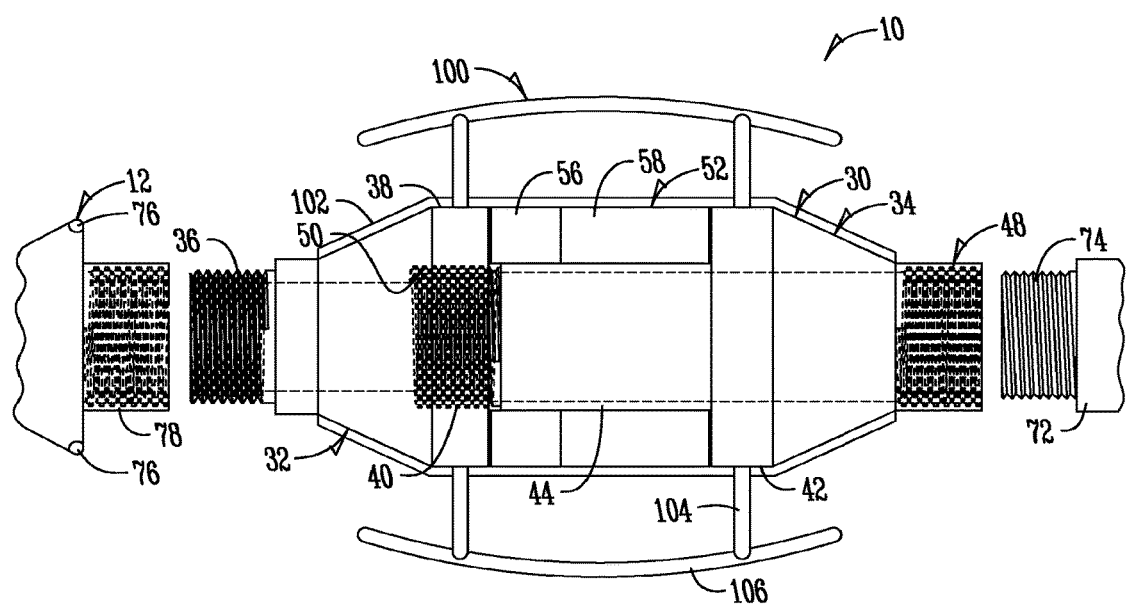
FIG. 7 is a side elevation view of a sonde and carrier configuration according to one aspect of the invention.

FIG. 6 illustrates a sonde according to one aspect of the invention. The sonde 52 includes a cylindrical body with a hollow core 54 for receiving the sleeve portion 44 of hose coupler 34. Included in the body of the sonde housing 52 is a battery compartment adapted to house various types of electrochemical cells such as alkaline batteries, rechargeable batteries including, NiCad, NiMh, Lithium Ion, and other rechargeable battery types. In place of an electrochemical cell, the present invention contemplates the use of one or more capacitors for storing power for subsequent later use by the sonde. The sonde housing 52 also includes a sonde compartment 58 for housing sonde hardware 59. The sonde hardware 59 includes a radio or frequency transmitter for emitting a signal 15 as illustrated in FIG. 1. A receiver, such as a locator 26 shown in FIG. 1, may be used to pinpoint the location of the signals 15 being emitted from the sonde hardware 59 to a location remote of the problem area within a pipe or the location of the sonde. The locator 26 may include various types of radio detection receivers. The sonde hardware 59 may be configured to transmit a continuous or pulsed signal. The frequency of the sonde hardware 59 may be adjusted to use those most commonly used in the underground utility and pipe locating industry. For example, common frequencies used with existing sonde devices are 33 Hz and 512 Hz. However, it should be appreciated that other frequencies may be utilized depending on the composition of the material between the sonde and locator, the distance between the sonde and locator, or the like. A range of frequencies from 640 Hz to 65 KHz is contemplated. Additionally, multiple sondes may be used together to emit multiple frequencies that would allow a locator to more specifically locate the sonde 10. The present invention contemplates the use of one sonde emitting one frequency, one sonde emitting multiple frequencies, or multiple sondes used in connection to emit multiple frequencies. A specialized frequency may also be used to distinguish the signal being transmitted from the sonde hardware 59 from other signals or noise that may be present. The necessary sonde hardware 59 for emitting a desired frequency or signal is shown and illustrated by way of example in U.S. Pat. Nos. 3,064,194 and 2,939,130, which are incorporated herein by reference. The present invention contemplates various means for powering the sonde hardware 59 within sonde housing 52. The sonde housing 52 may be formed of a molded resin or epoxy, with the hardware 59 incorporated during the molding process. The housing may also comprise a plastic material.

FIG. 7 illustrates an inline jet-sonde 10 of the invention. The inline jet-sonde 10 provides an interconnect between nozzle 12 adapted for cleaning and removing blockage within a pipe and high pressure line 72. Sonde housing 52 is connected between nozzle coupler 32 and hose coupler 34. The sleeve portion 44 of hose coupler 34 extends through the hollow core 54 of sonde housing 52. In one form of the invention, the diameter of the sonde housing 52 is commensurate with the outer diameter of flange portions 38 and 42 of nozzle coupler 32 and hose coupler 34. Keeping the sonde housing 52 within the outer periphery of the sonde carrier 30 removes the potential of the sonde housing 52 becoming snagged or caught in debris during the cleaning operation. Further, the design of the sonde carrier 30 does not restrict the volumetric flow or pressure of the high pressure water being passed through the sonde carrier 30 from the high pressure line 72 into the nozzle 12. However, the diameter of the sonde housing 52 may be larger than the outer diameter of the flange portions 38, 42 and still be within the spirit of the present invention. As previously mentioned, the sonde carrier 30 has a nozzle coupler 32 with a first end 36 adapted for connecting to nozzle 12. The sonde carrier 30 also includes a hose coupler 34 having a first end 48 adapted for connecting to connector 78 of high pressure line 72. The sonde housing 52 includes a battery compartment 56 and sonde compartment 58. The electronics within the sonde compartment 58 for transmitting a signal are powered by one or more battery types included in the battery compartment 56 and/or the sonde housing 52. Various electrochemical cells are contemplated. The sonde housing 52 may include an alkaline battery for powering the electronics within the sonde compartment 58. In another form, the sonde housing 52 may include one or more rechargeable battery types such NiCad, Lithium, NiMh or other rechargeable battery types for providing power to the sonde electronics. Both the battery compartment 56 and sonde compartment 58 are sealed and impervious to the threat of potentially ingressing water or other liquid. The battery compartment 56 is electrically connected with the sonde compartment 58 for transferring energy from the battery to the electronics of the sonde. Using batteries to power the sonde electronics allows the inline jet-sonde 10 to operate at a remote location without having to supply power remotely to the sonde. In addition, inductive charging pads (not shown) may recharge the batteries when the assembly is not in use in a pipe. The pads may charge the batteries on site.

Also shown in FIG. 7 is a centering skid 100 positioned at least partially around the carrier 30 of the inline jet-sonde 10. In the embodiment shown, the centering skid 100 includes a sleeve 102 that is frictionally fit about the carrier 30. Extending from the sleeve is a plurality of legs 104. At the end of the plurality of legs 104 is a plurality of skis 106. The centering skid 100 works as follows. The skid 100 is fitted around the carrier 30. The diameter of the skid is selected to be generally equal to the diameter of the pipe. As the inline jet-sonde assembly 10 moves through the pipe, the skid 100 positions the assembly in the center of the pipe. The skis 106 are able to move or slide along the wall of the pipe to move the assembly 10. As shown in FIG. 7, the skid 100 comprises a plastic or rubber material that is flexible to both fit about the carrier 30 and to also be able to move through the pipe. It should also be appreciated that the skid may comprise stainless steel or any other metal and the legs may include threaded portions that are threaded or inserted into apertures in the carrier 30 to fix the centering skid to the rest of the assembly 10.

Figure 8A:
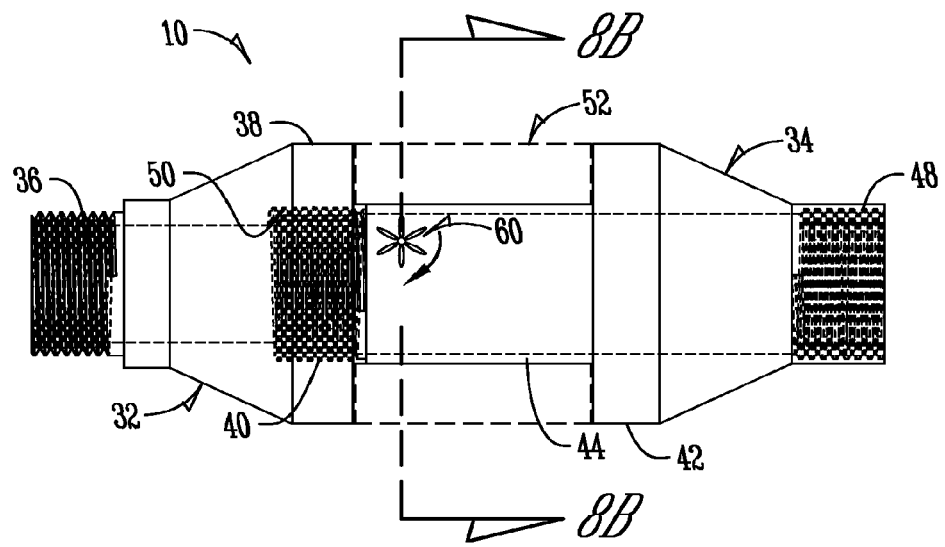
FIG. 8A is a side elevation view of sonde carrier according to another aspect of the invention.
Figure 8B:
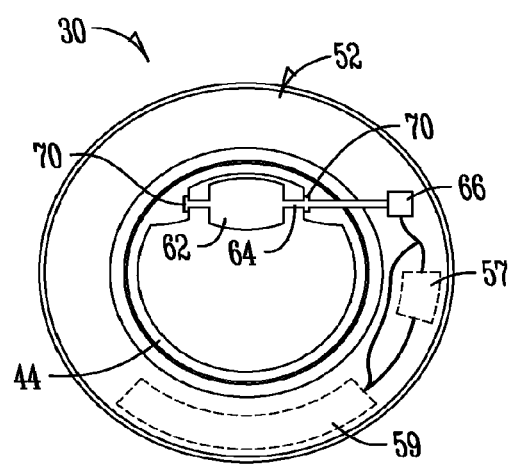
FIG. 8B is a sectional view taken along line 8B-8B in FIG. 8A.

The present invention contemplates other configurations for powering the electronics aboard the sonde 52. FIG. 8A-8B illustrates another configuration for powering the electronics aboard the sonde without requiring remote electrical feeds. For example, FIGS. 8A-8B illustrate a self-sustaining (self-powering) configuration for the inline jet-sonde 10. The inline jet-sonde 10 illustrated in FIGS. 8A and 8B uses the high pressure water being provided from the high pressure line 72 to the nozzle 12 for generating electricity to power the electronics aboard the sonde 52. In this configuration, the hose coupler 34 includes a turbine 60 rotatably mounted within the water passage way within hose coupler 34. The turbine 60 includes a plurality of blades 62 attached to shaft 64 as illustrated in FIG. 8B. In one aspect, the shaft 64 extends through the sleeve wall 44 and is operably connected to a generator 66 within the sonde housing 52. High pressure liquid passing through the sonde carrier 30 causes the turbine 60 to rotate. The rotational movement of the turbine 60 is transferred through shaft 64 to generator 66 for generating electricity for powering the electronics aboard the sonde 52. In one aspect, the generator 66 may be electrically connected to the sonde hardware 59. In another embodiment, the generator 66 may be electrically connected with an energy storage device 57 such as an alkaline or rechargeable battery source. Further, the present invention contemplates that electricity generated in addition to that needed to operate the sonde hardware 59 may be used to charge an energy storage device 57 for providing electricity to the sonde hardware 59 when water ceases to pass through the sonde carrier 30 and the generator 66 subsequently stops generating electricity for powering the sonde hardware 59. The turbine 60 may be rotatably set within the water flow path of the sonde carrier 30 using roller bearings 70. Grommets or other bushings may be used to seal the shaft 64 passing through the sleeve wall 44 of hose coupler 34 to prevent water from leaking into the sonde housing 52. Additionally, the turbine 60 may be placed at least partially in the housing wall to increase the area that water is able to pass through the carrier 30. It should be appreciated that while FIG. 8A-8B shows the turbine 60 in one position, the present invention contemplates moving the turbine around within the carrier 30 to best power the sonde hardware 59.

Figure 9A:
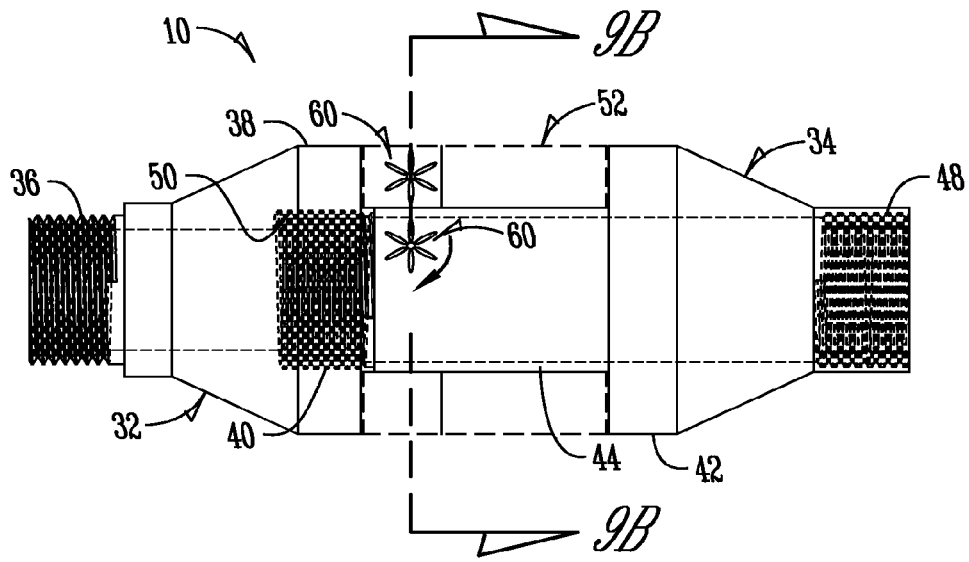
FIG. 9A is a side elevation view of a sonde and carrier configuration according to one aspect of the invention.
Figure 9B:
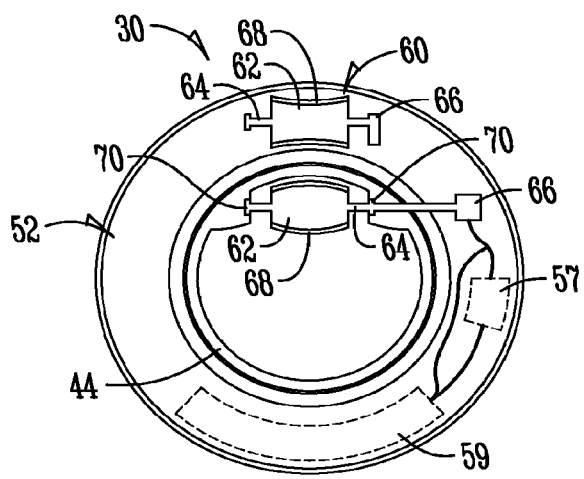
FIG. 9B is a sectional view taken along line 9B-9B in FIG. 9A.
Figure 9C:
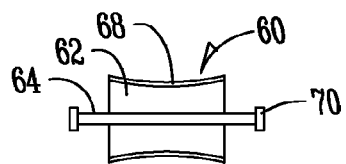
FIG. 9C is a perspective view of the turbine shown in FIGS. 9A-9B.

FIGS. 9A-9C illustrate an inline jet-sonde 10 according to another aspect of the present invention. Like that of the inline jet-sonde 10 illustrated in FIGS. 8A-8B, the inline jet-sonde 10 illustrated in FIG. 9A-9C uses the high pressure water being provided to a cleaning nozzle 12 for generating electricity for powering the electronics aboard the sonde 52. In the configuration illustrated in FIG. 9A-9C, the hose coupler 34 includes a fluid passageway within which is rotatably mounted a turbine 60. High pressure water passing through the sonde carrier 30 causes the turbine 60 to rotate. The turbine 60 is rotatably supported within the fluid passageway of the sonde carrier 30 by roller bearings 70 or other rotation supporting means as illustrated in FIG. 9B. In a preferred form, the turbine 60 includes a plurality of blades 62. Each blade includes a magnet 68 incorporated into the outermost radial, terminal edge of the blade 62. The present invention contemplates that the magnet 68 included at the terminal edge of each blade 62 may be a rare earth type magnet. Other magnets contemplated include neodymium iron boron (NIB), samarium cobalt (SmCo), alnico, ceramic, or ferrite magnets. In this particular embodiment, the shaft 64 upon which the blades 62 are mounted does not pass through the sleeve wall 44 of hose coupler 34. Thus, the turbine 60 mounted within the fluid passageway of sonde carrier 30 is totally enclosed within the fluid passageway of the sonde carrier 30. On the other side of the sleeve wall 44 of hose coupler 34 within the sonde housing 52 is positioned another turbine 60 configured in a complementary arrangement to the turbine 60 within the fluid passageway of sonde carrier 30. Rotation of the turbine 60 within the fluid passageway of the sonde carrier 30 causes the turbine 60 within the sonde housing 52 to rotate due to equal and opposing magnetic flux originating from the magnet 68 associated with each turbine 60. The turbine 60 within the sonde housing 52 imparts rotation to a shaft 64 connected to a generator 66. As with previous embodiments, the sonde housing may include one or more energy storage devices 57 connected to the generator for storing electricity for use during times when the generator is no longer generating electricity (e.g., when high pressure water is no longer passing through the fluid passageway of the sonde carrier 30). The generator 66 may also be electrically connected to sonde hardware 59 for powering the electronics aboard the sonde hardware 59. The energy storage device 57 within the sonde housing 52 may include a rechargeable battery that is charged during the cleaning operation, and subsequently drawn upon when water is no longer passing through the fluid passageway of sonde carrier 30. Thus, in these configurations, the sonde hardware continues to emit a signal for pinpointing the exact location of the inline jet-sonde 10 within the pipe regardless of whether or not high pressure liquid is being passed through the sonde carrier 30 to the cleaning nozzle 12.

Figure 10A:
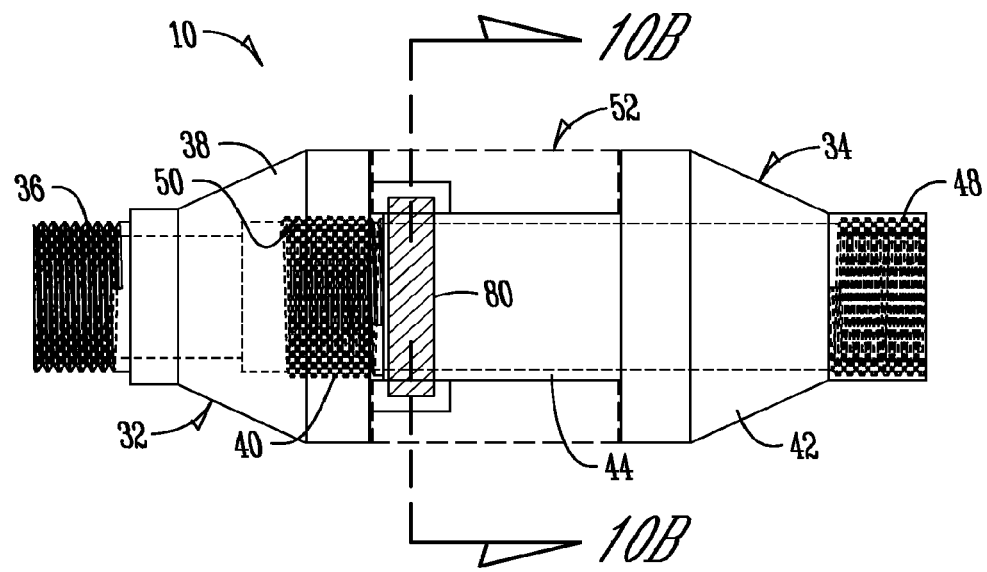
FIG. 10A is a side elevation view illustrating a sonde and carrier configuration according to another aspect of the invention.
Figure 10B:
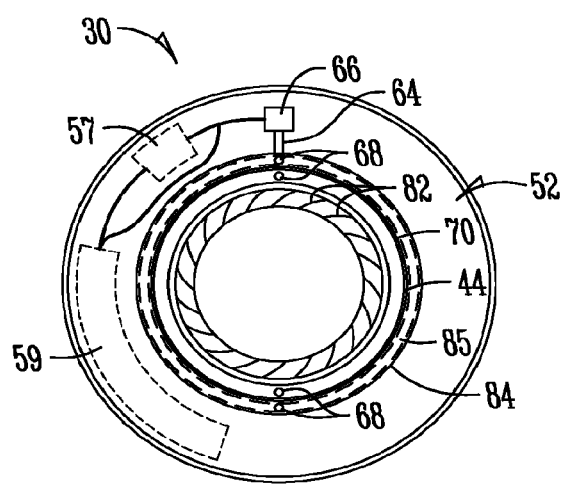
FIG. 10B is a sectional view taken along line 10B-10B in FIG. 10A.

FIGS. 10A-10B illustrate an inline jet-sonde according to another embodiment of the present invention. The configuration illustrated in FIGS. 10A-10B includes a hose coupler 34 having a turbine runner 80 rotatably mounted around the sleeve portion 44. The turbine runner 80 includes a plurality of blades 82 extending into the water passageway of the sonde carrier 30. High pressure water passing through the water passageway of the sonde carrier 30 imparts rotation to the turbine runner 80. Roller, needle or other types of bearings may be used to rotatably support rotation of turbine runner 80 about sleeve 44 of hose coupler 34. Similarly, gaskets, grommets, or other sleeves may be used to seal interfaces between the turbine runner 80 and sleeve 44 to prevent water from passing out of the sonde carrier 30 between interfaces of the turbine runner 80 and sleeve portion 44 of hose coupler 34. The sonde housing 52 surrounds the turbine runner 80 and sleeve portion 44 of hose coupler 34. As best illustrated in FIG. 10B, the sonde housing 52 includes a ring housing within which a ring 85 is rotatably supported. Both the turbine runner 80 and ring 85 include magnets 68. The counter opposing flux emitted from the magnet 68 in turbine runner 80 and magnet 68 in ring 85 imparts rotation to ring 85 within ring housing 84 when turbine runner 80 is rotated by high pressure water passing through sonde carrier 32 cleaning nozzle 12. Rotation of the ring 85 within ring housing 84 is transferred to a generator 66 via shaft 64. The electricity generated may be used to power the sonde hardware 59 aboard the sonde housing 52. Electricity may also be used to charge an energy storage device 57. When the turbine runner 80 is not being rotated by water, electricity stored within the energy storage device 57 may be used to operate the sonde hardware 59.

In the configurations illustrated in FIGS. 8A-10B, the present invention contemplates that opposing magnets may be replaced by electrical coils to generate electricity. Thus, the turbine runner 80 spins thereby spinning magnet 68 passed a coil included in a static ring 85, an electrical current is generated and passed to either the energy storage device 57 and/or sonde hardware 59 aboard the sonde housing 52. Replacing magnets 68 within the ring 85 with a coil allows the ring to operate as the generator and thereby does not require that a stand alone generator be included in the system for generating electricity for powering the sonde hardware 59 or providing energy to energy storage device 57.

Figure 11:
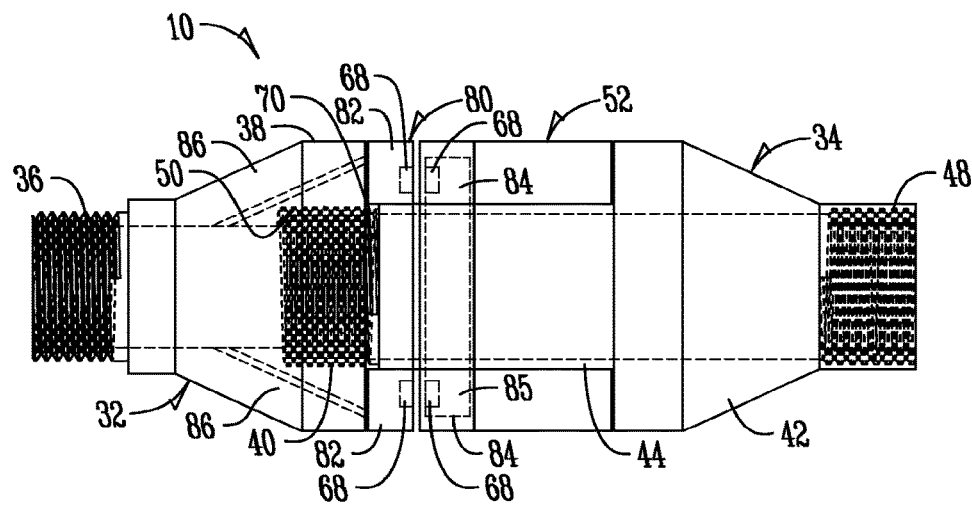
FIG. 11 is a sectional side elevation view illustrating a sonde and carrier configuration according to another aspect of the present invention.

FIG. 11 illustrates an inline jet-sonde 10 according to an exemplary aspect of the present invention. In the configuration illustrated in FIG. 11, the flange portion 38 of the nozzle coupler 32 includes one or more jet ports 86 configured to siphon off a high pressure liquid stream from the high pressure water flowing through the sonde carrier 30. Each jet port 86 is angled rearward toward a turbine runner 80 rotatably supported about the sleeve portion 44 of hose coupler 34. Turbine runner 80 includes a plurality of angled blades that when impacted by the high pressure water stream exiting the jet ports 86 causes the turbine runner 80 to rotate about sleeve 44. Appropriate bearings such as runner, roller or needle bearings may be used to support rotation of turbine runner 80 around sleeve portion 44 of hose coupler 34. Also included in the body of the turbine runner 80 is a plurality of magnets 68. In a preferred form, magnets 68 are recessed within the turbine runner 80 so as to be flush with the outer peripheral surface of turbine runner 80. In one aspect of this configuration, the turbine runner 80 is positioned between the flange portion 38 of nozzle coupler 32 and sonde housing 52 surrounding sleeve portion 44 of hose coupler 34. Within sonde housing 52 is a ring housing 84. A ring 85 is rotatably supported within ring housing 84 by one or more bearings. The ring housing 84 includes a plurality of magnets 68 recessed within the ring so as to be flush with the outer peripheral surface of the ring. The turbine runner 80 and the magnet 68 in the ring housing 84 are counter opposing whereby rotation imparted to the turbine runner 80 imparts rotation to the ring 85 rotatably supported within ring housing 84. The rotational energy provided by ring 85 is transferred, in one aspect of the invention, via a shaft to a generator which provides electricity to the sonde hardware 59 and/or energy storage device 57 within the sonde housing 52. Alternatively, magnets 68 within ring 85 may be replaced with coils, and ring 85 fixed so as to not rotate relative to sleeve portion 44 of hose coupler 34. In the case where ring 85 is fixed in position about sleeve portion 44 of hose coupler 34 and includes one or more coils, the rotation of turbine runner 80 with magnets 68 induces a current within the coils within the ring so as to provide electricity to an energy storage device 57 and/or sonde hardware 59 within sonde housing 52. Thus, regardless of whether or not high pressure liquid is being communicated through the sonde carrier 30 into a cleaning nozzle 12 the sonde hardware 59 can receive continuous power from the energy storage device 57.

Figure 12:
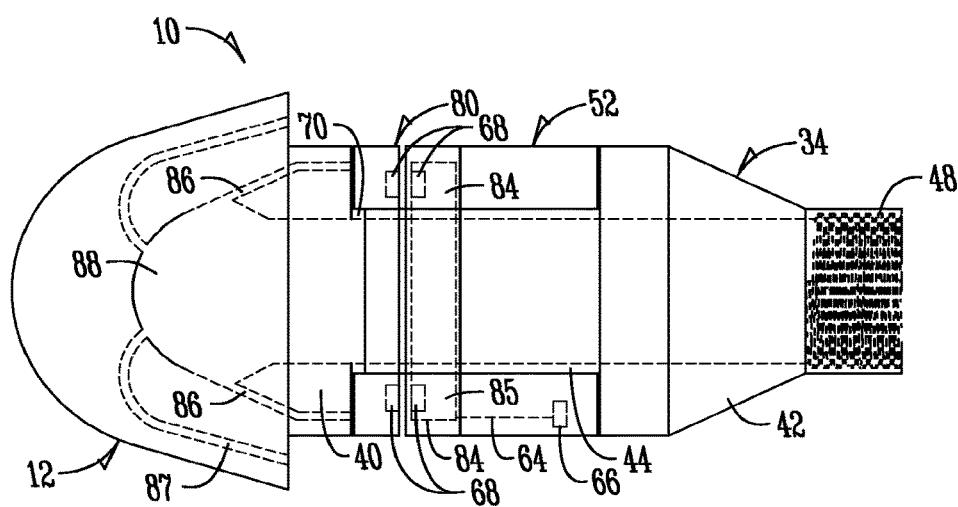
FIG. 12 is a sectional side elevation view illustrating a sonde and carrier configuration according to one aspect of the invention.

FIG. 12 illustrates an inline jet-sonde 10 according to another aspect of this invention. In the configuration illustrated in FIG. 12, a cleaning nozzle 12 is used in place of the nozzle coupler 32. The cleaning nozzle 12 is rotatably connected to the hose coupler 34. The cleaning nozzle 12 includes a cavity 88 in communication with the water passageway extending through the sonde carrier 30. The cavity 88 within nozzle 12 is in communication with a plurality of jet ports 86. The jet ports 86 are angled such that the high pressure water exiting the jet ports causes the nozzle 12 to rotate about the terminal end of sleeve 44 of hose coupler 34. A second plurality of ports 87 is located in the nozzle 12. The ports 87 direct exiting high pressure water that is spinning with the nozzle to clean debris within the pipe. The outer peripheral surface of nozzle 12 is adjacent the sonde housing 52 and includes one or more magnets 68 recessed so as to be flush with the outer peripheral surface. Opposite the magnets 68 within cleaning nozzle 12 and mounted within sonde housing 52 are a plurality of magnets 68 mounted within ring 85 rotatably supported within ring housing 84. The counter opposing effect of the magnets within cleaning nozzle 12 and magnets within the ring 85 causes the ring 85 to rotate when nozzle 12 rotates. In one embodiment, a shaft 64 is configured to transfer rotation from the spinning ring 85 to a generator 66. In another embodiment, the magnet 68 within the ring 85 may be replaced by coils and the ring 85 fixed so as to not rotate about sleeve portion 44 of hose coupler 34 so that rotation of cleaning nozzle 12 induces a current in the coils to provide electricity to the sonde hardware and/or energy storage device within sonde housing 52.

In addition to the configuration shown in FIG. 12, a similar, yet simpler version is contemplated by the present invention. In the alternative embodiment of FIG. 12, the ports 86 and turbine runner 80 may be removed. Doing so moves the second end 40 of the carrier 30 to the area of the carrier directly adjacent the magnets of the ring housing 84. A second set of magnets 68 can be placed within the nozzle 12. As mentioned above, the nozzle 12 will spin at the bearings 70 due to water being forced out of the ports 87. The magnets 68 placed in the nozzle 12 will interact with the magnets in the ring housing, which causes the ring 85 to rotate, thus powering the generator 66. The advantage of removing the ports 86 and turbine runner 80 is that there will be less moving parts, and thus, less energy loss in the system. The energy producing, turbo flow, process becomes more efficient and less likely to break down.

FIG. 13 illustrates a sectional side elevation view of another exemplary embodiment of the inline jet-sonde 10. The inline jet-sonde 10 illustrated in FIG. 13 is one example of a two or multi-piece carrier body. In the case of troubleshooting, evaluating or cleaning smaller diameter pipes it may be necessary to configure the inline jet-sonde 10 in a multi-piece configuration so it is capable of working its way through bends, corners and other blockage areas within a smaller diameter pipe. One embodiment provided to meet this objective is illustrated in FIG. 13, while others are contemplated herein. As with previous embodiments, the inline jet-sonde 10 illustrated in FIG. 13 includes a sonde carrier 30 as previously set forth and described above. The first end 48 of the hose coupler 34 is configured to connect to a high pressure line 72 via connector 74. The sonde housing 52 surrounds the sleeve portion 44 spaced between flange portions 38 and 42. The first end 36 of nozzle coupler 32 is operably connected to a flexible connector 92, such as hose, tubing or other flexible water carrying membrane. The flexible connector 92 may include an external or embedded rib, spiral reinforcement or sleeve reinforcement member to prevent the connector 92 from crimping or failing. The opposite end of the flexible connector 92 is attached to the first end 48 of the hose coupler 34 carrying the turbine housing 94. The turbine housing 94 is spaced between flange portions 38 and 42 of the hose coupler 34 and nozzle coupler 32. Any and all electrical generating embodiments as previously set forth and described above are contemplated for use in the turbine housing 94 supported by sonde carrier 30. A power transmission line 96 is connected to the turbine housing 94 and in turn connected to the sonde housing 52 for communicating electrical power from the turbine housing 94 to the sonde housing 52 for powering electronics aboard the sonde. A nozzle 12 or other evaluation/troubleshooting device may be connected to first end 36 of nozzle coupler 32. The flexible connector 92 allows the inline jet-sonde 10 shown in FIG. 13 to navigate through corners, curves or other blockages in small diameter pipes.

The flexible connector 92 has an inner passageway through which high pressure water is communicated during operation. Separating the turbine housing 94 from the sonde housing 52 in a multi-body configuration allows the inline jet-sonde 10 to occupy a smaller diameter, which in turn allows the inline jet-sonde 10 to be used in smaller diameter pipes that might not otherwise permit navigation of a troubleshooting, evaluation or cleaning device therethrough.

It is further contemplated that the inline jet-sonde 10 illustrated in FIG. 13 may take on other configurations and embodiments within the spirit and scope of the present invention. For example, a multi-body carrier such as illustrated in FIG. 13 may be used to carry various types of devices inline into and through an underground pipe for providing evaluation, troubleshooting or cleaning of the pipe. In one embodiment, one carrier 30 may be used to carry a sonde while another carrier 30 operably attached to the first carrier may be used to carry a battery housing for providing power to the sonde. The battery housing could use any type of electrochemical cell whether alkaline or rechargeable. A capacitor could also be used to store electrical energy for providing electricity to the sonde for powering the device remotely. Other inline pipe troubleshooting or evaluation devices could replace the sonde housing 52. These devices could be powered by a battery housing carried by a second carrier such as illustrated in FIG. 13.

The preferred embodiments of the present invention have been set forth in the drawings and in the specification and although specific terms are employed, these are used in the generically descriptive sense only and are not used for the purpose of limitation. Changes in the formed proportion of parts as well in the substitution of equivalents are contemplated as circumstances may suggest or are rendered expedient without departing from the spirit or scope of the invention as further defined in the following claims.

What is claimed is:

1. A multi-piece sonde suitable for use in troubleshooting, evaluating, or cleaning a pipe, comprising:
    a first carrier having a sonde housing with a central fluid passageway;
    a sonde transmitter operably positioned about the central fluid passageway;
    a second carrier having a housing with a central fluid passageway;
    a power source carried by the second carrier;
    a flexible connector having a central fluid passageway and first and second opposing ends;
    wherein the first carrier is operably connected to the first end of the flexible connector and the second carrier is operably connected to the second end of the flexible connector; and
    an electrical connection between the power source and the sonde transmitter carried by the flexible connector.

2. The multi-piece sonde of claim 1, wherein the central fluid passageway of the first and second carrier and the flexible connector comprises a hose having at least one end configured for connection to a pressurized source of fluid.

3. The multi-piece sonde of claim 1, wherein the sonde transmitter is removable from the first carrier.

4. The multi-piece sonde of claim 1, wherein the power source is removable from the second carrier.

5. The multi-piece sonde of claim 1, wherein the flexible connector has an outer peripheral diameter smaller than an outer peripheral diameter of the first and second carrier.

6. The multi-piece sonde of claim 1, wherein the flexible connector comprises a fluid line with one or more reinforcing members to prevent crimping.

7. The multi-piece sonde of claim 1, wherein the pipe comprises preformed pipe.

8. A multi-piece sonde suitable for user in troubleshooting, evaluating, or cleaning a pipe, comprising:
    a central fluid passageway;
    a first carrier having a sonde housing disposed about the central fluid passageway;
    a sonde transmitter operably positioned about the sonde housing;
    a second carrier having a housing disposed about the central fluid passageway;
    a power source carried by the second carrier;
    a flexible connector disposed about the central fluid passageway, the flexible connector having first and second opposing ends;
    wherein the first carrier is operably connected to the first end of the flexible connector and the second carrier is operably connected to the second end of the flexible connector; and
    an electrical connection between the power source and the sonde transmitter carried by the flexible connector.

9. The multi-piece sonde of claim 8, wherein the central fluid passageway of the first and second carrier and the flexible connector comprises a hose having at least one end configured for connection to a pressurized source of fluid.

10. The multi-piece sonde of claim 8, wherein the sonde transmitter is removable from an outermost peripheral surface of the first carrier.

11. The multi-piece sonde of claim 8, wherein the power source is removable from the second carrier.

12. The multi-piece sonde of claim 8, wherein the flexible connector has an outer peripheral diameter smaller than an outer peripheral diameter of the first and second carrier.

13. A method for troubleshooting, evaluating, or cleaning a pipe with a multi-piece sonde, comprising:

providing an assembly comprising a first carrier having a sonde transmitter operably positioned about a sonde housing, a second carrier having a power source carried by the second carrier, and a flexible connector having first and second opposing ends, wherein the first carrier is operably connected to the first end of the flexible connector and the second carrier is operably connected to the second end of the flexible connector;

inserting the assembly into a preformed pipe with a bend;

navigating the bend in the preformed pipe by flexing the flexible connector around the bend when passing the first carrier through the bend;

passing fluid through a central fluid passageway in the first carrier, second carrier and the flexible connector for cleaning the preformed pipe; and powering the sonde transmitter with the power source carried by the second carrier.

14. The method of claim 13, wherein the flexible connector comprises an electrical connection carried by the flexible connector and connected between the sonde transmitter and the power source carried by the second carrier.

15. The method of claim 13, wherein the sonde transmitter is removable from the first carrier.

16. The method of claim 13, wherein the power source is removable from the second carrier.

17. The method of claim 13, wherein the flexible connector has an outer peripheral diameter smaller than an outer peripheral diameter of the first and second carrier for navigating the bend in the preformed pipe.

18. The method of claim 13 further comprising:
connecting a pipe cleaning tool to the first carrier.

19. The method of claim 13 further comprising:
connecting a pressurized source of fluid to the second carrier.

* * * * *